United States Patent
Okano et al.

(10) Patent No.: US 9,902,385 B2
(45) Date of Patent: Feb. 27, 2018

(54) VEHICULAR BRAKING DEVICE

(71) Applicant: ADVICS CO., LTD., Kariya-shi, Aichi-ken (JP)

(72) Inventors: Takahiro Okano, Chiryu (JP); Masaki Ninoyu, Obu (JP)

(73) Assignee: ADVICS CO., LTD., Kariya, Aichi-Ken (JP)

( * ) Notice: Subject to any disclaimer, the term of this patent is extended or adjusted under 35 U.S.C. 154(b) by 0 days.

(21) Appl. No.: 15/100,035

(22) PCT Filed: Nov. 28, 2014

(86) PCT No.: PCT/JP2014/081658
§ 371 (c)(1),
(2) Date: May 27, 2016

(87) PCT Pub. No.: WO2015/080277
PCT Pub. Date: Jun. 4, 2015

(65) Prior Publication Data
US 2017/0036658 A1 Feb. 9, 2017

(30) Foreign Application Priority Data

Nov. 28, 2013 (JP) ................................ 2013-246098

(51) Int. Cl.
*B60T 13/66* (2006.01)
*B60T 7/04* (2006.01)
(Continued)

(52) U.S. Cl.
CPC ............ *B60T 13/662* (2013.01); *B60T 7/042* (2013.01); *B60T 8/4077* (2013.01); *B60T 11/20* (2013.01); *B60T 13/146* (2013.01); *B60T 13/686* (2013.01)

(58) Field of Classification Search
CPC ...... B60T 13/662; B60T 11/20; B60T 13/686; B60T 7/042; B60T 13/146; B60T 8/4077
(Continued)

(56) References Cited

U.S. PATENT DOCUMENTS 9,163,645 B2 * 10/2015 Maruyama .............. B60T 8/172
9,199,621 B2 * 12/2015 Noro ........................ B60T 13/58
(Continued)

FOREIGN PATENT DOCUMENTS

| JP | 2009-507714 A | 2/2009 |
| JP | 2013-193619 A | 9/2013 |
| JP | 2013-209051 A | 10/2013 |

OTHER PUBLICATIONS

International Search Report (PCT/ISA/210) dated Feb. 19, 2015, by the Japanese Patent Office as the International Searching Authority for International Application No. PCT/JP2014/081658.
(Continued)

*Primary Examiner* — Thomas J Williams
*Assistant Examiner* — Mariano Sy
(74) *Attorney, Agent, or Firm* — Buchanan Ingersoll & Rooney PC

(57) ABSTRACT

A vehicular braking device can shorten the time between pilot pressure input to a regulator and generation of servo pressure, and reduce product-by-product time variations for servo pressure generation. This vehicular braking device comprises: a servo pressure rising start time measurement unit that measures, in advance, a servo pressure rising start time which is the time from pilot pressure input to a first pilot chamber by opening a pressure increase valve to when a servo pressure starts to rise, and stores the servo pressure rising start time in a storage unit; a pilot pressure increase time calculation unit that calculates a pilot pressure increase time based on the servo pressure rising start time stored in
(Continued)

advance in the storage unit; and a pre-fill control unit that increases the pilot pressure for the pilot pressure increase time by opening the pressure increase valve when brake pedal operation is detected.

9 Claims, 8 Drawing Sheets

(51) Int. Cl.
*B60T 11/20* (2006.01)
*B60T 13/14* (2006.01)
*B60T 13/68* (2006.01)
*B60T 8/40* (2006.01)

(58) Field of Classification Search
USPC .............. 303/115.2, 15, 20, 115.1, 119.1
See application file for complete search history.

(56) References Cited

U.S. PATENT DOCUMENTS

| | | | |
|---|---|---|---|
| 9,227,613 B2* | 1/2016 | Kuki | B60T 13/686 |
| 9,365,198 B2* | 6/2016 | Masuda | B60T 13/143 |
| 9,475,474 B2* | 10/2016 | Takeuchi | B60T 13/161 |
| 2008/0257670 A1 | 10/2008 | Drumm et al. | |
| 2013/0127241 A1* | 5/2013 | Sakata | B60T 13/58 303/14 |
| 2014/0265546 A1 | 9/2014 | Shimizu et al. | |
| 2015/0015061 A1 | 1/2015 | Masuda et al. | |
| 2015/0226458 A1* | 8/2015 | Miles | F24J 2/1047 126/652 |
| 2015/0291136 A1* | 10/2015 | Ninoyu | B60T 8/17 701/70 |
| 2015/0336551 A1* | 11/2015 | Okano | B60T 13/662 701/70 |
| 2016/0001755 A1* | 1/2016 | Takeuchi | B60T 8/4077 60/534 |
| 2016/0121866 A1* | 5/2016 | Ozeki | B60T 7/042 303/15 |
| 2016/0280191 A1* | 9/2016 | Okano | B60T 8/17 |
| 2016/0347297 A1* | 12/2016 | Ninoyu | B60T 8/17616 |

OTHER PUBLICATIONS

Written Opinion (PCT/ISA/237) dated Feb. 19, 2015, by the Japanese Patent Office as the International Searching Authority for International Application No. PCT/JP2014/081658.

* cited by examiner

[Fig.1]
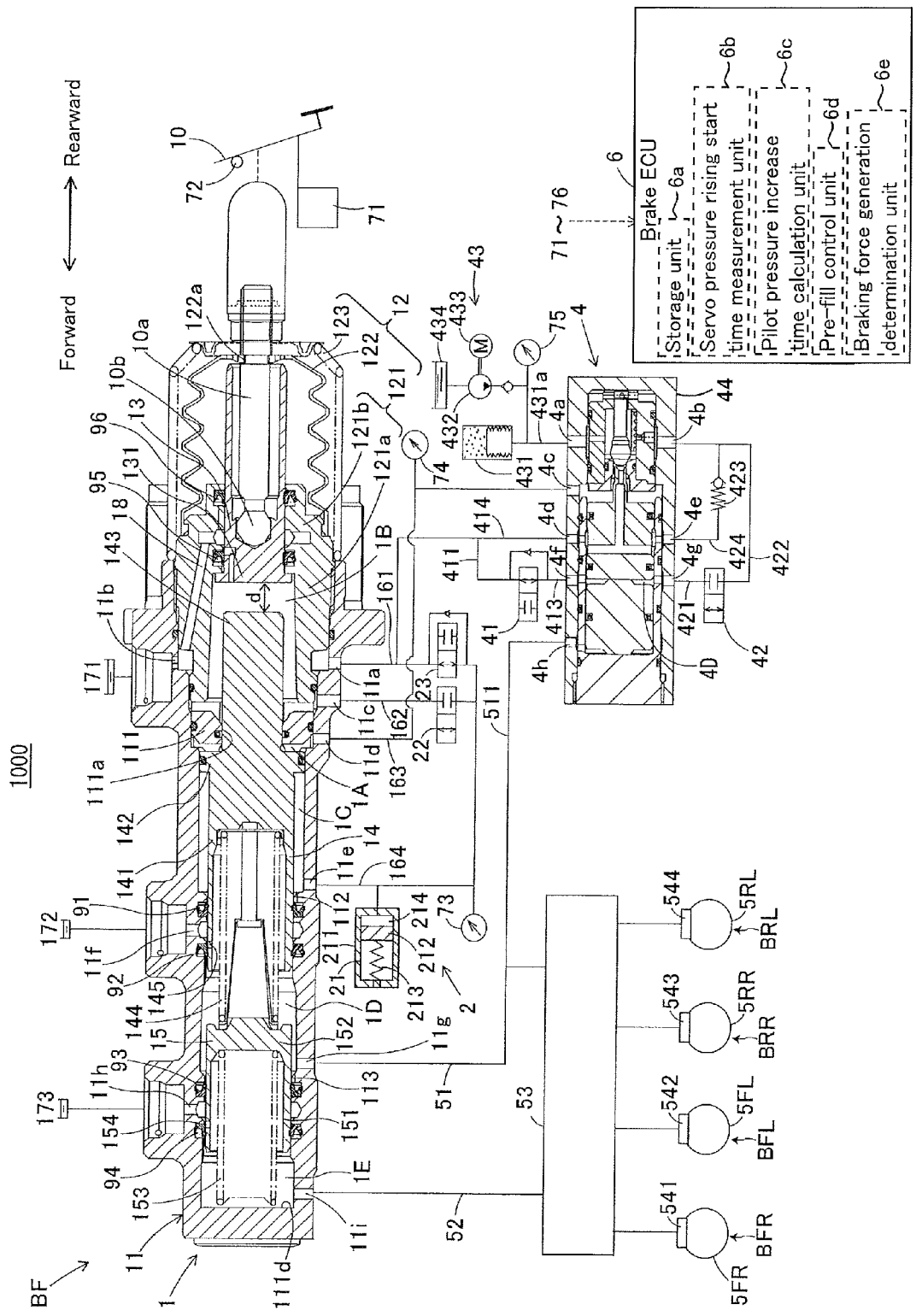

[Fig.2]
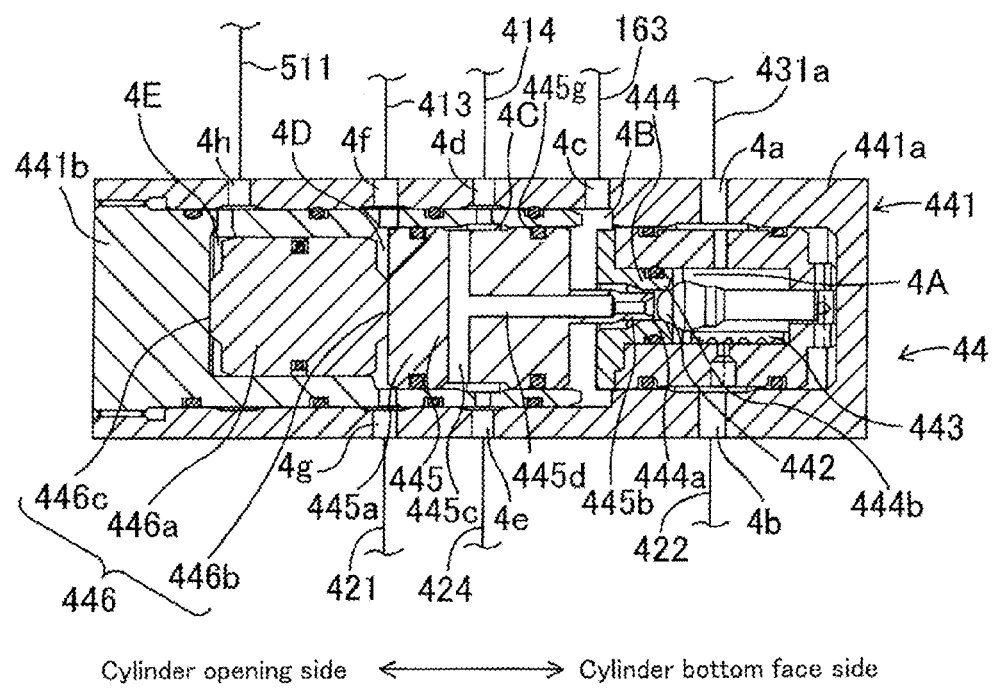
Cylinder opening side ⟵⟶ Cylinder bottom face side

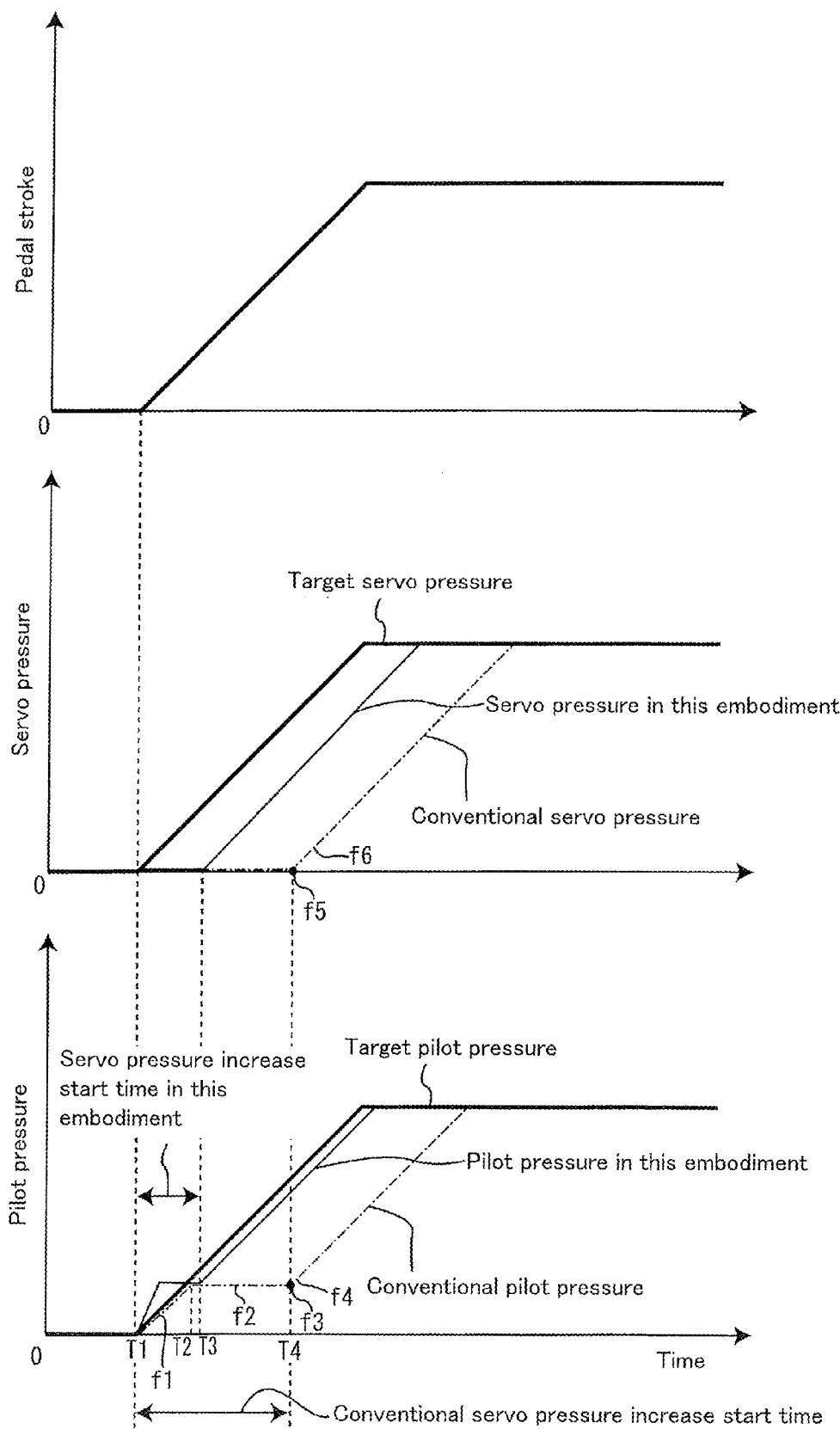
[Fig.3]

[Fig.4]
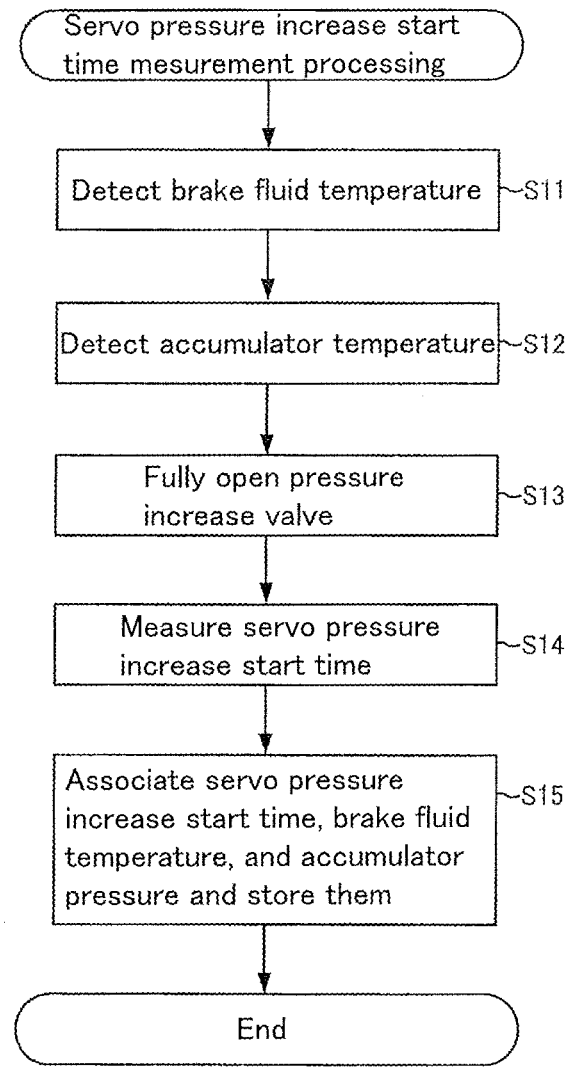

[Fig.5]
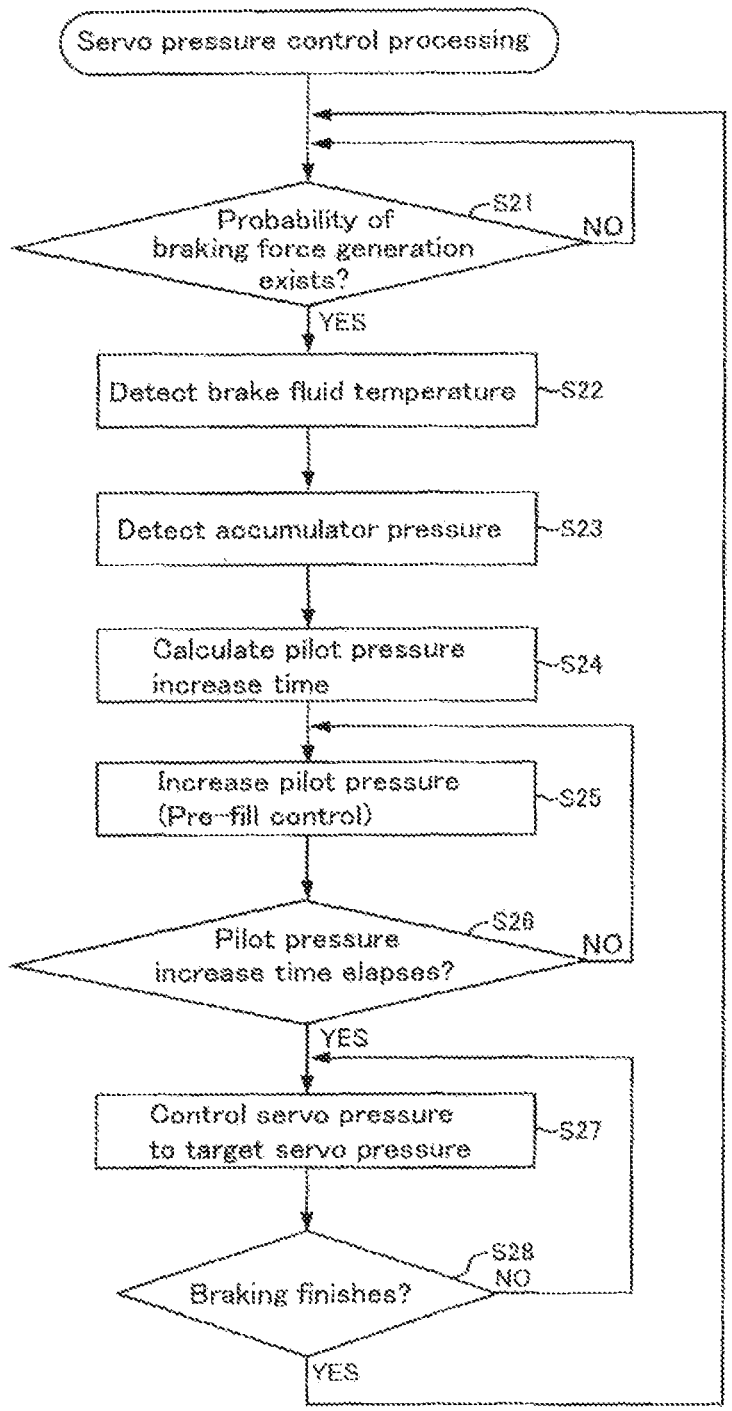

[Fig.6]
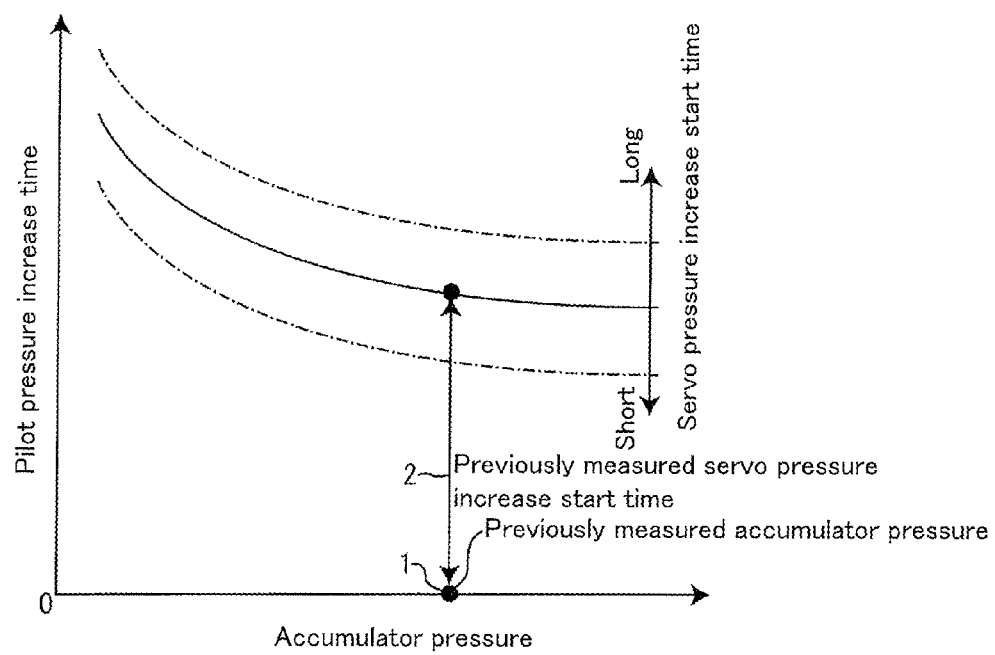

[Fig.7]
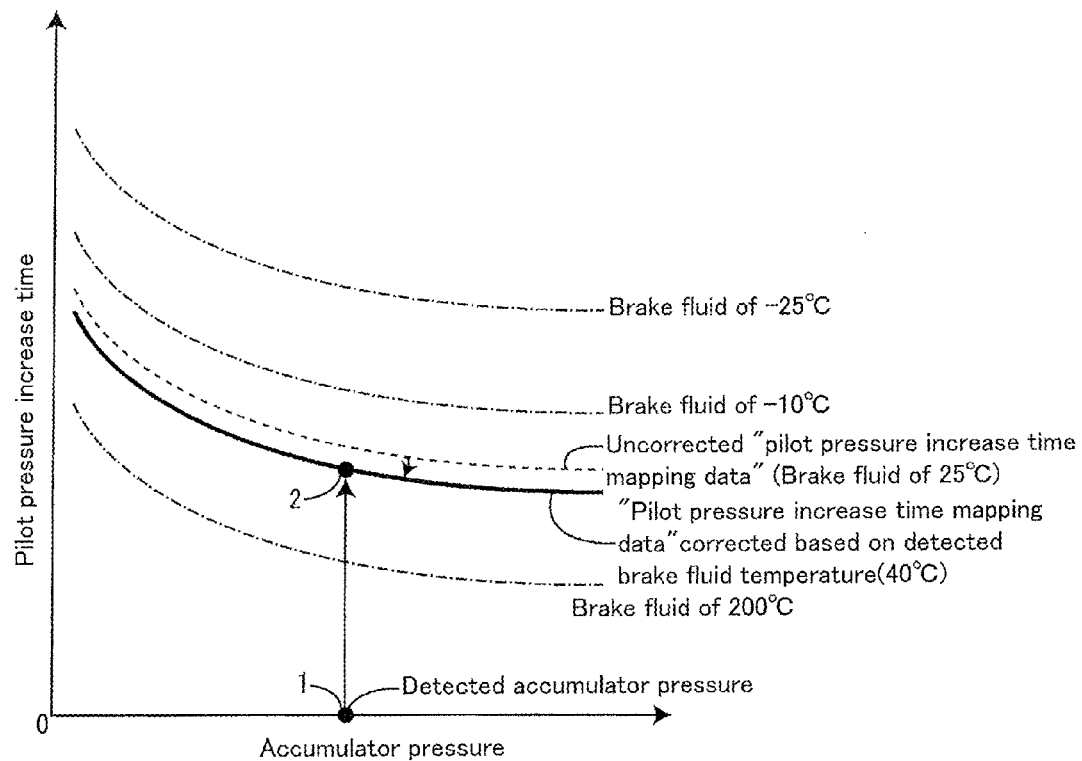

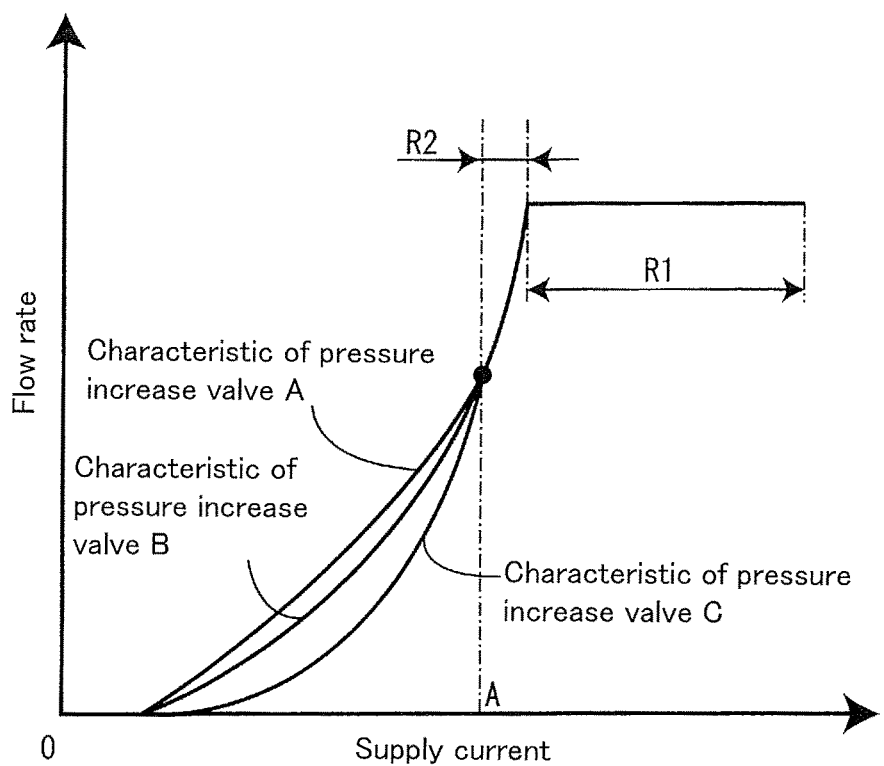
[Fig.8]

VEHICULAR BRAKING DEVICE

TECHNICAL FIELD

The present invention relates to a vehicular braking device for applying a friction braking force to a vehicle.

BACKGROUND ART

Examples of a vehicular braking device for applying a friction braking force to a vehicle includes a vehicular braking device described in Patent document 1. In the vehicular braking device, a pressure control valve in a regulator is subjected to a pilot pressure generated through an accumulator and an electromagnetic valve and slides in the regulator, thereby regulating an accumulator pressure to generate a servo pressure. The servo pressure thus generated is inputted to a servo chamber in a master cylinder, thereby feeding a brake fluid from a master cylinder to a wheel cylinder of a friction braking device to generate a friction braking force in the friction braking device.

PRIOR ART DOCUMENT

Patent Document

Japanese Translation of PCT International Application Publication No. 2009-507714

SUMMARY OF THE INVENTION

Problems to be Solved by the Invention

While the pilot pressure is generated by the action of the electromagnetic valve, causing no substantial time lag, the servo pressure is generated by the mechanical action that is sliding of the pressure control valve in the regulator, causing a time lag between inputting of the pilot pressure to the regulator and actual generation of the servo pressure. Moreover, due to manufacturing variations in the regulator, the time lag between inputting of the pilot pressure to the regulator and actual generation of the servo pressure varies among products of the regulator.

The present invention is devised in consideration of such circumstances, and its object is to provide a vehicular braking device that can shorten the time between inputting of the pilot pressure to a regulator to generation of the servo pressure; and that can reduce product-by-product variations in the time for generating the servo pressure.

Means for Solving the Problems

To attain the above object, according to a first aspect of the invention, a vehicular braking device includes a master cylinder connected to a wheel cylinder of a friction brake device for applying a braking force to a wheel of a vehicle, the master cylinder supplying a brake fluid to the wheel cylinder; an output piston slidably disposed in the master cylinder, the output piston being driven by a servo pressure that is a fluid pressure in a servo chamber delimited by the master cylinder to change the volume of a master chamber filled with the brake fluid supplied to the wheel cylinder; a regulator that allows the servo pressure corresponding to a pilot pressure that is a fluid pressure in a partitioned pilot chamber to generate in the servo chamber, on the basis of the fluid pressure of the brake fluid accumulated in the accumulator; an electromagnetic valve that adjusts a flow of the brake fluid from the accumulator to the pilot chamber; a braking force generation determination unit that determines a level of probability of generation of the braking force in the friction brake device; a storage unit that stores a servo pressure rising start time that is a time from when the pilot pressure is a value equivalent to an atmospheric pressure to when the servo pressure starts to rise by inputting the brake fluid from the accumulator into the pilot chamber by means of the electromagnetic valve, or a setting time set based on the servo pressure rising start time; a pre-fill control unit that performs pre-fill control to open the electromagnetic valve and input the brake fluid from the accumulator into the pilot chamber for the servo pressure rising start time or the setting time stored in the storage unit, when the braking force generation determination unit determines that the probability of generation of the braking force in the friction brake device is high.

As described above, the storage unit stores the servo pressure rising start time that is a time from when the pilot pressure is the value equivalent to the atmospheric pressure to when the servo pressure starts to rise by inputting the brake fluid from the accumulator into the pilot chamber by means of the electromagnetic valve, or the setting time set based on the servo pressure rising start time. The pre-fill control unit performs pre-fill control to open the electromagnetic valve and input the brake fluid from the accumulator into the pilot chamber for the servo pressure rising start time or the setting time stored in the storage unit, when the braking force generation determination unit determines that the probability of generation of the braking force in the friction brake device is high. Accordingly, when the probability of generation of the braking force in the friction brake device is determined to be high, the brake fluid flows from the accumulator into the pilot chamber for the servo pressure rising start time or the time based on the setting time stored in the storage unit, increasing the pilot pressure. This shortens the time from inputting of the pilot pressure to the regulator to generation of the servo pressure. That is, conventionally, for generating the braking force in the friction brake device by generating the servo pressure, a time lag has occurred in the servo pressure generated by the mechanical action in the regulator. However, according to the present invention, since the pilot pressure increases until the servo pressure occurs, the time required to generate the servo pressure is shortened. Further, since the pilot pressure increases for the time based on the servo pressure rising start time measured by opening the electromagnetic valve in advance, product-by-product variations in the time for generating the master pressure are reduced.

According to a second aspect of the invention, in the first aspect of the invention, the storage unit stores a full-open rising start time, as the servo pressure rising start time, which is a time from when the pilot pressure is the value equivalent to the atmospheric pressure to when the electromagnetic valve is fully opened to input the brake fluid from the accumulator to the pilot chamber and the servo pressure starts to rise, or stores, as the setting time, time set based on the full-open rising start time, and in the pre-fill control, the pre-fill control unit fully opens the electromagnetic valve for the full-open rising start time or the setting time, that is stored in the storage unit.

The flow rate of the brake fluid flowing from the electromagnetic valve in a degree of opening from 0 to full varies among products of the electromagnetic valve. Meanwhile, the flow rate of the brake fluid flowing from the fully-opened electromagnetic valve has less variations in products of the electromagnetic valve. As described above, the storage unit stores, as a servo pressure rising start time, the full-open rising start time in the state where the electromagnetic valve is fully opened. Thus, since variations in the flow rate of the brake fluid flowing from the fully-opened electromagnetic valve are small, variations in the servo pressure rising start time among products of the electromagnetic valves are small. In the pre-fill control, the pre-fill control unit fully opens the electromagnetic valve for the full-open rising start time or the setting time, which is stored in the storage unit. Thus, at full-opening of the electromagnetic valve, the flow rate of the brake fluid does not vary among products of the manufactured electromagnetic valve. This can prevent a lag of the servo pressure, and an excessive servo pressure that is not based on the operating amount of a brake operating member, due to variations in the flow rate of the brake fluid among products of the electromagnetic valve.

According to a third aspect of the invention, in the first or second aspect of the invention, the vehicular braking device further includes an accumulator pressure detection unit that detects an accumulator pressure that is the fluid pressure of the brake fluid stored in the accumulator; and a pressure time correction unit that corrects the servo pressure rising start time or the setting time stored in the storage unit on the basis of the accumulator pressure detected by the accumulator pressure detection unit, and in the pre-fill control, the pre-fill control unit opens the electromagnetic valve for the servo pressure rising start time or the setting time corrected by the pressure time correction unit.

As described above, the pressure time correction unit corrects the servo pressure rising start time or the setting time stored in the storage unit on the basis of the accumulator pressure detected by the accumulator pressure detection unit. This can prevent a lag of the servo pressure, and an excessive servo pressure that is not based on the operating amount of a brake operating member, due to variations in the accumulator pressure in the pre-fill control. As the accumulator pressure decreases, the pilot pressure generated by the electromagnetic valve also decreases, further delaying generation of the servo pressure caused by the mechanical action in the regulator. Thus, the pressure time correction unit corrects servo pressure rising start time or the setting time so as to be longer as the accumulator pressure decreases, preventing the lag of generation of the servo pressure. Further, as the accumulator pressure increases, the pilot pressure caused by the electromagnetic valve also increases, promoting generation of the servo pressure caused by the mechanical action in the regulator. The pressure time correction unit corrects the servo pressure rising start time or the setting time so as to be shorter as the accumulator pressure increases, preventing generation of an excessive servo pressure that is not based on the operating amount of the brake operating member, which is caused by inputting of the pilot pressure increased after generation of the servo pressure into the pilot chamber.

According to a fourth aspect of the invention, in any of the first to third aspects of the invention, the vehicular braking device further includes a temperature detection unit that detects the brake fluid temperature; and a temperature time correction unit that corrects the servo pressure rising start time or the setting time stored in the storage unit on the basis of the brake fluid temperature detected by the temperature detection unit, and in the pre-fill control, the pre-fill control unit opens the electromagnetic valve for the servo pressure rising start time or the setting time that is corrected by the temperature time correction unit.

As described above, the temperature time correction unit corrects the servo pressure rising start time or the setting time stored in the storage unit on the basis of the brake fluid temperature detected by the temperature detection unit. This can prevent a lag of generation of the servo pressure, and generation of an excessive servo pressure that is not based on the operating amount of the brake operating member, due to variations in the brake fluid temperature in the pre-fill control. As the brake fluid temperature lowers, flowing of the brake fluid is further inhibited, delaying generation of the servo pressure by the mechanical action in the regulator. Thus, the temperature time correction unit corrects servo pressure rising start time or the setting time so as to be longer as the brake fluid temperature decreases, preventing the lag of generation of the servo pressure. Further, as the brake fluid temperature rises, the flowing resistance of the brake fluid lowers, promoting generation of the servo pressure by the mechanical action in the regulator. The temperature time correction unit corrects the servo pressure rising start time or the setting time so as to be shorter as the brake fluid temperature increases, preventing generation of an excessive servo pressure that is not based on the operating amount of the brake operating member, which is caused by inputting of the pilot pressure increased after generation of the servo pressure into the pilot chamber.

According to a fifth aspect of the invention, in any of the first to fourth aspects of the invention, the vehicular braking device further includes a determination unit that determines whether or not the servo pressure starts to rise; and a measurement unit that opens the electromagnetic valve from a time when the pilot pressure is the value equivalent to the atmospheric pressure to a time when the determination unit determines that the servo pressure starts to rise, and measures the servo pressure rising start time, and the storage unit stores the servo pressure rising start time measured by the measurement unit, or the setting time set based on the servo pressure rising start time measured by the measurement unit.

As described above, the determination unit determines that the servo pressure starts to rise. The measurement unit opens the electromagnetic valve from the time when the pilot pressure is the value equivalent to the atmospheric pressure to the time when the determination unit determines that the servo pressure starts to rise, and measures the servo pressure rising start time. Therefore, even when the servo pressure rising start time changes due to deterioration of the vehicular braking device over time, the determination unit and the measurement unit can measure the servo pressure rising start time. In this manner, such change of the servo pressure rising start time due to deterioration of the vehicular braking device over time can be addressed.

According to a sixth aspect of the invention, in the fifth aspect of the invention, the vehicular braking device further includes an accumulator pressure detection unit that detects an accumulator pressure that is the fluid pressure of the brake fluid stored in the accumulator, and the storage unit associates the servo pressure rising start time or the setting time with the accumulator pressure detected by the accumulator pressure detection unit, when the measurement unit measures the servo pressure rising start time, and stores the associated servo pressure rising start time or the setting time, and in the pre-fill control, the pre-fill control unit opens the electromagnetic valve for the servo pressure rising start time or the setting time that is associated with the accumulator pressure detected by the accumulator pressure detection unit.

As described above, the storage unit associates the servo pressure rising start time or the setting time with the accumulator pressure detected by the accumulator pressure detection unit when the measurement unit measures the servo pressure rising start time, and stores the associated servo pressure rising start time or the setting time. In the pre-fill control, the pre-fill control unit opens the electromagnetic valve for the servo pressure rising start time or the setting time that is associated with the accumulator pressure detected by the accumulator pressure detection unit. Thereby, the pre-measured servo pressure rising start time is stored in association with the accumulator pressure at measurement. Then, the pre-fill control is performed in consideration with the accumulator pressure at measurement of the servo pressure rising start time. This can prevent a lag of generation of the servo pressure, and generation of an excessive servo pressure that is not based on the operating amount of the brake operating member, due to a difference between the accumulator pressure at measurement of the servo pressure rising start time and the accumulator pressure in the pre-fill control.

According to a seventh aspect of the invention, in the fifth or sixth aspect of the invention, the vehicular braking device further includes a temperature detection unit that detects the brake fluid temperature, and the storage unit associates the servo pressure rising start time or the setting time with the brake fluid temperature, which is detected by the temperature detection unit when the measurement unit detects the servo pressure rising start time, and the pre-fill control unit opens the electromagnetic valve for the servo pressure rising start time or the setting time that is associated with the brake fluid temperature in the pre-fill control.

As described above, the storage unit associates the servo pressure rising start time or the setting time with the brake fluid temperature, which is detected by the temperature detection unit when the servo pressure rising start time is measured, and stores the associated servo pressure rising start time or the setting time. In the pre-fill control, the pre-fill control unit opens the electromagnetic valve for the servo pressure rising start time or the setting time associated with the brake fluid temperature. In this manner, the pre-measured servo pressure rising start time is associated with the brake fluid temperature at measurement, and stored. Then, the pre-fill control is performed in consideration with the brake fluid temperature at measurement of the servo pressure rising start time. This can prevent a lag of generation of the servo pressure, and generation of an excessive servo pressure that is not based on the operating amount of the brake operating member, due to a difference between the brake fluid temperature at measurement of the servo pressure rising start time and the brake fluid temperature in the pre-fill control.

According to an eighth aspect of the invention, in any of the fifth to seventh aspects of the invention, the vehicular braking device further includes a servo pressure detection unit that detects the servo pressure, and the determination unit determines that the servo pressure starts to rise on the basis of the servo pressure detected by the servo pressure detection unit.

As described above, since the servo pressure detection unit that directly detects the servo pressure determines that the servo pressure starts to rise, the servo pressure rising start time can be correctly detected.

According to a ninth aspect of the invention, in any of the fifth to eighth aspects of the invention, the vehicular braking device further includes an accumulator pressure detection unit that detects an accumulator pressure that is the fluid pressure of the brake fluid stored in the accumulator, and the determination unit determines that the servo pressure starts to rise on the basis of the accumulator pressure detected by the accumulator pressure detection unit.

Therefore, without using the servo pressure detection unit that detects the servo pressure, the servo pressure can be detected using the accumulator pressure detection unit that detects the accumulator pressure. That is, since the accumulator pressure decreases with an increase in the servo pressure, the accumulator pressure detection unit can detect a decrease in the accumulator pressure to detect an increase in the servo pressure.

BRIEF DESCRIPTION OF THE DRAWINGS

FIG. 1 is a configuration diagram illustrating configuration of a vehicular braking device in this embodiment.

FIG. 2 is a sectional view illustrating detailed configuration of a regulator in this embodiment.

FIG. 3 is a time chart illustrating relationship among pedal stroke, servo pressure, and pilot pressure.

FIG. 4 is a flow chart illustrating "servo pressure rising start time measurement processing" that is a control program executed by a brake ECU illustrated in FIG. 1.

FIG. 5 is a flow chart illustrating "servo pressure control processing" that is a control program executed by the brake ECU in FIG. 1.

FIG. 6 is a graph illustrating "pilot pressure increase time mapping base data" representing relationship between accumulator pressure and pilot pressure increase time.

FIG. 7 is a view illustrating "pilot pressure increase time mapping data" for calculating pilot pressure increase time on the basis of the accumulator pressure.

FIG. 8 is a graph illustrating relationship between supply current to a pressure increase valve and flow rate.

DESCRIPTION OF EMBODIMENTS

A vehicular braking device 1000 in accordance with an embodiment of the present invention will be described below with reference to figures. In figures for description, shape and size of each component may not be necessarily precise.

As illustrated in FIG. 1, the vehicular braking device 1000 includes a friction braking force generator BF for generating a friction braking force in wheels 5FR, 5FL, 5RR, and 5RL, and a brake ECU 6 for controlling the friction braking force generator BF.

(Friction Braking Force Generator BF)

The friction braking force generator BF includes a master cylinder 1, a reaction force generator 2, a first control valve 22, a second control valve 23, a servo pressure generator 4, a fluid pressure controller 53, various sensors 71 to 76 and the like.

(Master Cylinder 1)

The master cylinder 1 serves to a brake fluid to the fluid pressure controller 53 according to the operating amount of a brake pedal 10 (corresponding to "brake operating member"), and includes a main cylinder 11, a cover cylinder 12, an input piston 13, a first master piston (corresponding to "master piston") 14, and a second master piston 15 and the like.

The main cylinder 11 is a substantially cylindrical closed-end housing that is closed at its front and opened at its rear. The main cylinder 11 is provided with an inner wall 111 inwardly protruding like a flange, in the rear of the inner circumference of the main cylinder 11. A through hole 111a penetrating in the forward and rearward direction is formed at the center of the inner wall 111. Further, a small-diameter portion 112 (rear) and a small-diameter portion 113 (front) that have a smaller diameter than the main cylinder 11 are provided in front of the inner wall 111. That is, the small-diameter portions 112, 113 protrude inward circularly from the inner circumferential face of the main cylinder 11. The first master piston 14 that is axially slidable on the small-diameter portion 112 is disposed in the main cylinder 11. Similarly, the second master piston 15 that is axially slidable on the small-diameter portion 113 is disposed in the main cylinder 11.

The cover cylinder 12 includes a substantially cylindrical cylinder portion 121, a bellows tube-like boot 122, and a cup-like compression spring 123. The cylinder portion 121 is disposed at the rear end of the main cylinder 11, and is coaxially fitted in a rear opening of the main cylinder 11. A front part 121a of the cylinder portion 121 has a larger inner diameter than the through hole 111a of the inner wall 111. Further, a rear part 121b of the cylinder portion 121 has a smaller inner diameter than the front part 121a.

The bellows tube-like dustproof boot 122 can contract and extend in the forward and rearward direction, and abut on an opening of the rear end of the cylinder portion 121 at the front side. A through hole 122a is formed at the center of main cylinder in the rear of the boot 122. The compression spring 123 is a coil-like biasing member disposed around the boot 122, and is contracted such that its front side abuts the rear end of the main cylinder 11, and its rear side comes close to the through hole 122a of the boot 122. The rear end of the boot 122 and the rear end of the compression spring 123 are connected to an operating rod 10a. The compression spring 123 biases the operating rod 10a rearward.

The input piston 13 slides in the cover cylinder 12 according to the operation of the brake pedal 10. The input piston 13 is a substantially cylindrical closed-end piston having a front bottom face and a rear opening. A bottom wall 131 forming the bottom face of the input piston 13 has a larger diameter than the other parts of the input piston 13. The input piston 13 is axially slidable in the rear part 121b of the cylinder portion 121 in a fluid-tight manner, and the bottom wall 131 is disposed on the inner circumferential side of the front part 121a of the cylinder portion 121.

The operating rod 10a linked to the brake pedal 10 is disposed in the input piston 13. A pivot 10b at the front end of the operating rod 10a can press the input piston 13 forward. The rear end of the operating rod 10a protrudes outward through the rear opening of the input piston 13 and the through hole 122a of the boot 122, and is connected to the brake pedal 10. When the brake pedal 10 is pressed, the operating rod 10a advances while axially pressing the boot 122 and the compression spring 123. With advancement of the operating rod 10a, the input piston 13 also advances in conjunction.

The first master piston 14 is disposed so as to be axially slidable along the inner wall 111 of the main cylinder 11. The first master piston 14 is unitarily formed of a pressing tubular portion 141, a flange portion 142, and a protrusion portion 143 in this order from the front. The pressing tubular portion 141 is a substantially cylindrical closed-end portion having a front opening, has a gap from the inner circumferential face of the main cylinder 11, and is slidingly contact with the small-diameter portion 112. A biasing member 144 that is a coil spring is disposed in an internal space of the pressing tubular portion 141 away from the second master piston 15. The biasing member 144 biases the first master piston 14 rearward. In other words, the first master piston 14 is biased toward a set initial position by the biasing member 144.

The flange portion 142 has a larger diameter than the pressing tubular portion 141, and is slidingly contact with the inner circumferential face of the main cylinder 11. The protrusion portion 143 has a smaller diameter than the flange portion 142, and is slidingly contact with the through hole 111a of the inner wall 111 in a fluid-tight manner. The rear end of the protrusion portion 143 protrudes into an internal space of the cylinder portion 121 through the through hole 111a, and is separated from the inner circumferential face of the cylinder portion 121. The rear end face of the protrusion portion 143 is separated from the bottom wall 131 of the input piston 13, and a distance d between them is variable.

A first master chamber 1D is defined by the inner circumferential face of the main cylinder 11, the front side of the pressing tubular portion 141 of the first master piston 14, and the rear side of the second master piston 15. Further, a rear chamber in the rear of the first master chamber 1D is defined by the inner circumferential face (inner circumferential portion) of the main cylinder 11, the small-diameter portion 112, the front surface of the inner wall 111, and the outer circumferential face of the first master piston 14. The front end and the rear end of the flange portion 142 of the first master piston 14 divide the rear chamber into a front part and a rear part, the front part defines a second fluid pressure chamber 1C, and the rear part defines a servo chamber 1A. Further, a first fluid pressure chamber 1B is defined by the inner circumferential portion of the main cylinder 11, the rear face of the inner wall 111, the inner circumferential face (inner circumferential portion) of the front part 121a of the cylinder portion 121, the protrusion portion 143 (rear end) of the first master piston 14, and the front end of the input piston 13.

The second master piston 15 is disposed in front of the first master piston 14 in the main cylinder 11 so as to be axially slidable along the small-diameter portion 113. The second master piston 15 is unitarily formed of a tubular pressing tubular portion 151 having a front opening, and a bottom wall 152 that closes the rear side of the pressing tubular portion 151. The bottom wall 152 and the first master piston 14 support the biasing member 144. A coil spring-like biasing member 153 is disposed in an internal space of the pressing tubular portion 151 away from a closed inner bottom face 111d of the main cylinder 11. The biasing member 153 biases the second master piston 15 rearward. In other words, the second master piston 15 is biased toward a set initial position by the biasing member 153. A second master chamber 1E is defined by the inner circumferential face of the main cylinder 11, the inner bottom face 111d, and the second master piston 15.

The master cylinder 1 is formed with ports 11a to 11i that communicates the inside with the outside of the master cylinder 1. The port 11a is formed in the rear of the inner wall 111 in the main cylinder 11. The port 11b is formed at the same axial position as the port 11a as opposed to the port 11a. The port 11a communicates with the port 11b via an annular space between the inner circumferential face of the main cylinder 11 and the outer circumferential face of the cylinder portion 121. The port 11a and the port 11b are connected to a pipe 161 as well as a reservoir 171.

The port 11b communicates with the first fluid pressure chamber 1B via a passage 18 formed in the cylinder portion 121 and the input piston 13. When the input piston 13 advances, the passage 18 is blocked, disconnecting the first fluid pressure chamber 1B from the reservoir 171.

The port 11c is formed in the rear of the inner wall 111 and in front of the port 11a, and communicates the first fluid pressure chamber 1B with a pipe 162. The port 11d is formed in front of the inner wall 111 and in front of the port 11c, and communicates the servo chamber 1A with a pipe 163. The port 11e is formed in front of the port 11d, and communicates the second fluid pressure chamber 1C with a pipe 164.

The port 11f is formed between sealing members 91, 92 of the small-diameter portion 112, and communicates a reservoir 172 with the inside of the main cylinder 11. The port 11f communicates with the first master chamber 1D via a passage 145 formed in the first master piston 14. The passage 145 is formed so as to disconnect the port 11f from the first master chamber 1D when the first master piston 14 advances. The port 11g is formed in front of the port 11f, and communicates the first master chamber 1D with a pipe 51.

The port 11h is formed between sealing members 93, 94 of the small-diameter portion 113, and communicates a reservoir 173 with the inside of the main cylinder 11. The port 11h communicates with the second master chamber 1E via a passage 154 formed in the pressing tubular portion 151 of the second master piston 15. The passage 154 is positioned so as to disconnect the port 11h from the second master chamber 1E when the second master piston 15 advances. The port 11i is formed in front of the port 11h, and communicates the second master chamber 1E with a pipe 52.

Sealing member such as O-rings (black circles in this figure) are disposed in the master cylinder 1 as appropriate. The sealing members 91, 92 are disposed on the small-diameter portion 112, and abut the outer circumferential face of the first master piston 14 in a fluid-tight manner. Similarly, the sealing members 93, 94 are disposed on the small-diameter portion 113, and abut the outer circumferential face of the second master piston 15 in a fluid-tight manner. Further, sealing members 95, 96 are disposed between the input piston 13 and the cylinder portion 121.

A stroke sensor 71 detects the operating amount (brake operating amount, pedal stroke) of the brake pedal 10 by the driver, and transmits a detection signal to the brake ECU 6. A brake stop switch 72 detects whether the driver operates the brake pedal 10 using a binary signal, and transmits a detection signal to the brake ECU 6.

(Reaction Force Generator 2)

The reaction force generator 2 serves to generate a reaction force that counteracts an operating force of the brake pedal 10, and is configured of mainly a stroke simulator 21. The stroke simulator 21 generates a reaction force fluid pressure in the first fluid pressure chamber 1B and the second fluid pressure chamber 1C in response to the operation of the brake pedal 10. The stroke simulator 21 is configured by slidably fitting a piston 212 into a cylinder 211. The piston 212 is biased forward by a compression spring 213, and a reaction force fluid pressure chamber 214 is formed on the side of the front surface of the piston 212. The reaction force fluid pressure chamber 214 is connected to the second fluid pressure chamber 1C via the pipe 164 and the port 11e, and is connected to the first control valve 22 and the second control valve 23 via the pipe 164.

(First Control Valve 22)

The first control valve 22 is an electromagnetic valve that is closed in the nonconducting state, and is opened/closed under control of the brake ECU 6. The first control valve 22 is connected between the pipe 164 and the pipe 162. Here, the pipe 164 communicates with the second fluid pressure chamber 1C via the port 11e, and the pipe 162 communicates with the first fluid pressure chamber 1B via the port 11c. When the first control valve 22 opens, the first fluid pressure chamber 1B is opened, and when the first control valve 22 closes, the first fluid pressure chamber 1B is closed tightly. Thus, the pipe 164 and the pipe 162 are provided to communicate the first fluid pressure chamber 1B with the second fluid pressure chamber 1C.

The first control valve 22 closes in the nonconducting state to disconnect the first fluid pressure chamber 1B from the second fluid pressure chamber 1C. Accordingly, the first fluid pressure chamber 1B is closed tightly and thus, the brake fluid has nowhere to go, and the input piston 13 and the first master piston 14 work together while keeping a constant distance d therebetween. The first control valve 22 is opened in the conducting state to communicate the first fluid pressure chamber 1B with the second fluid pressure chamber 1C. As a result, a change in the volume of the first fluid pressure chamber 1B and the second fluid pressure chamber 1C due to advance/retreat of the first master piston 14 is absorbed by movement of the brake fluid.

A brake fluid sensor 73 serves to detect the reaction force fluid pressure in the second fluid pressure chamber 1C and the first fluid pressure chamber 1B, and is connected to the pipe 164. The brake fluid sensor 73 detects the pressure in the second fluid pressure chamber 1C when the first control valve 22 is in the closed state, and also detects the pressure in the first fluid pressure chamber 1B (or the reaction force fluid pressure) when the first control valve 22 is in the opened state. The brake fluid sensor 73 detects temperature of the brake fluid flowing through the pipe 164. The brake fluid sensor 73 transmits a detection signal to the brake ECU 6.

(Second Control Valve 23)

The second control valve 23 is an electromagnetic valve that opens in the nonconducting state, and is opened/closed under control of the brake ECU 6. The second control valve 23 is connected between the pipe 164 and the pipe 161. Here, the pipe 164 communicates with the second fluid pressure chamber 1C via the port 11e, and the pipe 161 communicates with the reservoir 171 via the port 11a. Accordingly, the second control valve 23 communicates the second fluid pressure chamber 1C with the reservoir 171 in the nonconducting state, generating no reaction force fluid pressure, and disconnects the second fluid pressure chamber 1C from the reservoir 171 in the conducting state, generating the reaction force fluid pressure.

(Servo Pressure Generator 4)

The servo pressure generator 4 includes a pressure decrease valve 41, a pressure increase valve 42, a high-pressure feed portion 43, a regulator 44 and the like. The pressure decrease valve 41 is an electromagnetic valve that opens in the nonconducting state, and its flow rate is controlled by the brake ECU 6. One side of the pressure decrease valve 41 is connected to the pipe 161 via a pipe 411, and the other side of the pressure decrease valve 41 is connected to a pipe 413. That is, one side of the pressure decrease valve 41 communicates with the reservoir 171 via the pipes 411, 161, and the ports 11a, 11b. The pressure increase valve 42 is an electromagnetic valve that closes in the nonconducting state, and its flow rate is controlled by the brake ECU 6. One side of the pressure increase valve 42 is connected to a pipe 421, and the other side of the pressure increase valve 42 is connected to a pipe 422. The pressure decrease valve 41 and the pressure increase valve 42 are pilot fluid pressure generators that adjust the flow of the brake fluid from the accumulator 431 to a first pilot chamber 4D.

The high-pressure feed portion 43 is a portion that feeds the high-pressure brake fluid to the regulator 44. The high-pressure feed portion 43 includes an accumulator 431, a fluid pressure pump 432, a motor 433, a reservoir 434 and the like.

The accumulator 431 is a tank that stores the high-pressure brake fluid, which has the fluid pressure of the brake fluid as "accumulator pressure". The accumulator 431 is connected to the regulator 44 and the fluid pressure pump 432 via the pipe 431a. The fluid pressure pump 432 is driven by the motor 433, and pressure-feeds the brake fluid stored in the reservoir 434 to the accumulator 431. A brake fluid sensor 75 provided on the pipe 431a detects the accumulator fluid pressure of the accumulator 431. The accumulator fluid pressure corresponds to the amount of the brake fluid stored in the accumulator 431. The brake fluid sensor 75 detects temperature of the brake fluid flowing through the pipe 431a. The brake fluid sensor 75 transmits a detection signal to the brake ECU 6.

When the brake fluid sensor 75 detects that the accumulator fluid pressure lowers to a predetermined value or less, the motor 433 is driven according to an instruction from the brake ECU 6. Thereby, the fluid pressure pump 432 pressure-feeds the brake fluid to the accumulator 431, and returns the accumulator fluid pressure to a predetermined value or more.

FIG. 2 is a partial sectional view illustrating internal configuration of a mechanical regulator 44 configuring the servo pressure generator 4. As illustrated, the regulator 44 includes a cylinder 441, a ball valve 442, a biasing portion 443, a valve seat 444, a control piston 445, a sub piston 446 and the like. The regulator 44 generates the "servo pressure" corresponding to the "pilot pressure" inputted to the first pilot chamber 4D in the servo chamber 1A on the basis of the "accumulator pressure" stored in the accumulator 431.

The cylinder 441 includes a substantially cylindrical closed-end cylinder case 441a having a bottom face on one side (right side in the figure) and a cover member 441b that closes an opening (left side in the figure) of the cylinder case 441a. The cylinder case 441a is formed with a plurality of ports 4a to 4h that communicate the inside with the outside of the cylinder case. The cover member 441b is a substantially cylindrical closed-end body, and has ports opposed to the plurality of ports 4a to 4h of the cylinder case.

The port 4a is connected to a pipe 431a. The port 4b is connected to the pipe 422. The output port 4c is connected to the pipe 163. The pipe 163 connects the servo chamber 1A to the output port 4c. The port 4d is connected to the pipe 161 via a pipe 414. The port 4e is connected to a pipe 424, and is connected to the pipe 422 via a relief valve 423. The port 4f is connected to the pipe 413. The port 4g is connected to the pipe 421. The port 4h is connected to a pipe 511 branching from the pipe 51.

The ball valve 442 is a ball-shaped valve, and is disposed on the side of the bottom face of the cylinder case 441a in the cylinder 441 (also referred to as cylinder bottom face side). The biasing portion 443 is a spring member that biases the ball valve 442 toward the side of an opening of the cylinder case 441a (also referred to as cylinder opening side), and is provided on the bottom face of the cylinder case 441a. The valve seat 444 is a wall member provided on the inner circumferential face of the cylinder case 441a, and divides the cylinder opening side from the cylinder bottom face side. A penetration passage 444a that communicates the cylinder opening side with the cylinder bottom face side is formed at the center of the valve seat 444. The valve seat 444 holds the ball valve 442 from the cylinder opening side such that the biased ball valve 442 closes the penetration passage 444a. A valve seat face 444b, on which the ball valve 442 is removably seated (contact), is formed in an opening of the penetration passage 444a on the cylinder bottom face side.

A space defined by the ball valve 442, the biasing portion 443, the valve seat 444, and the inner circumferential face of the cylinder case 441a of the cylinder bottom face side is defined as a "first chamber 4A". The first chamber 4A is filled with the brake fluid, is connected to the pipe 431a via the port 4a, and is connected to the pipe 422 via the port 4b.

The control piston 445 includes a substantially cylindrical body portion 445a and a substantially cylindrical protruding portion 445b having a smaller diameter than the body portion 445a. The body portion 445a is coaxially and fluid-tightly disposed in the cylinder 441 on the cylinder opening side of the valve seat 444 so as to be axially slidable. The body portion 445a is biased toward the cylinder opening side by a biasing member not shown. A passage 445c that is opened on the circumference face of the body portion 445a at both ends and radially (vertically in this figure) extends is formed substantially at the axial center of the body portion 445a. The inner circumferential face of the part of the cylinder 441, which corresponds to the openings of the passage 445c, has the port 4d, and is dented. The dented is defined as a "third chamber 4C".

The protruding portion 445b protrudes toward the cylinder bottom face side from the center of the end face of the body portion 445a on the cylinder bottom face side. The protruding portion 445b has a smaller diameter than the penetration passage 444a of the valve seat 444. The protruding portion 445b and the penetration passage 444a are coaxially disposed. A front end of the protruding portion 445b is separated from the ball valve 442 by a predetermined distance on the cylinder opening side. The protruding portion 445b is formed with a passage 445d that is opened at the center of the end face of the protruding portion 445b on the cylinder bottom face side and axially extends. The passage 445d extends into the body portion 445a, and is connected to the passage 445c.

A space delimited by the end face of the body portion 445a on the cylinder bottom face side, the outer circumferential face of the protruding portion 445b, the inner circumferential face of the cylinder 441, the valve seat 444, and the ball valve 442 is defined as a "second chamber 4B". The second chamber 4B communicates with the ports 4d, 4e via the passages 445d, 445c, and the third chamber 4C.

The sub piston 446 includes a sub body portion 446a, a first protruding portion 446b, and a second protruding portion 446c. The sub body portion 446a is substantially cylindrical. The sub body portion 446a is coaxially and fluid-tightly disposed in the cylinder 441 on the cylinder opening side of the body portion 445a so as to be axially slidable.

The first protruding portion 446b is substantially cylindrical, has a smaller diameter than the sub body portion 446a, and protrudes at the center of the end face of the sub body portion 446a on the cylinder bottom face side. The first protruding portion 446b abuts the end face of the body portion 445a on the cylinder opening side. The second protruding portion 446c has the same shape as the first protruding portion 446b, and protrudes at the center of the end face of the sub body portion 446a on the cylinder opening side. The second protruding portion 446c abuts the cover member 441b.

A space delimited by the end face of the sub body portion 446a on the cylinder bottom face side, the outer circumferential face of the first protruding portion 446b, the end face of the control piston 445 on the cylinder opening side, and the inner circumferential face of the cylinder 441 is defined as a first pilot chamber 4D. The first pilot chamber 4D communicates with the pressure decrease valve 41 via the port 4f and the pipe 413, and communicates with the pressure increase valve 42 via the port 4g and the pipe 421.

A space delimited by the end face of the sub body portion 446a on the cylinder opening side, the outer circumferential face of the second protruding portion 446c, the cover member 441b, and the inner circumferential face of the cylinder 441 is defined as a "second pilot chamber 4E". The second pilot chamber 4E communicates with the port 11g via the port 4h and the pipes 511, 51. Each of the chambers 4A to 4E is filled with the brake fluid. A brake fluid sensor 74 serves to detect the "servo pressure" fed to the servo chamber 1A, and is connected to the pipe 163. The brake fluid sensor 74 detects temperature of the brake fluid flowing through the pipe 163. The brake fluid sensor 74 transmits a detection signal to the brake ECU 6.

(Fluid Pressure Controller 53)

The first master chamber 1D and the second master chamber 1E that generate the fluid pressure of the master cylinder (master fluid pressure) communicate with the wheel cylinders 541 to 544 via the pipes 51, 52 and the fluid pressure controller 53. The wheel cylinders 541 to 544 configure the friction brake devices BFR to BRL provided on the wheels 5FR to 5RL, respectively. Specifically, the port 11g of the first master chamber 1D and the port 11i of the second master chamber 1E are coupled to the fluid pressure controller 53 for anti-lock brake control, anti-skid control, and anti-collision control via the pipe 51 and the pipe 52, respectively. The fluid pressure controller 53 is coupled to the wheel cylinders 541 to 544 that activate the respective friction brake devices BFR to BRL for braking the wheels 5FR to 5RL.

In the fluid pressure controller 53 thus configured, the brake ECU 6 switches each of the holding valves and the pressure decrease valve according to the master pressure, the wheel speed, and longitudinal acceleration, and activates the motor as necessary to adjust the brake fluid pressure applied to the wheel cylinders 541 to 544, that is, the braking force applied to the wheels 5FR to 5RL, thereby performing anti-lock brake control, anti-skid control, and anti-collision control. The fluid pressure controller 53 adjusts the amount and timing of the brake fluid supplied from the master cylinder 1 according to an instruction of the brake ECU 6, and supplies the adjusted brake fluid to the wheel cylinders 541 to 544.

The fluid pressure sent from the accumulator 431 of the servo pressure generator 4 is controlled by the pressure increase valve 42 and the pressure decrease valve 41, generating the "servo pressure" in the servo chamber 1A. Then, the first master piston 14 and the second master piston 15 advance to pressurize the first master chamber 1D and the second master chamber 1E. The fluid pressure in the first master chamber 1D and the second master chamber 1E is inputted as the master pressure from the ports 11g, 11i to the wheel cylinders 541 to 544 via the pipes 51, 52 and the fluid pressure controller 53 and thus, a friction braking force is applied to the wheels 5FR to 5RL.

(Brake ECU 6)

The brake ECU 6 is an electronic control unit, and has a microcomputer. The microcomputer includes an input/output interface, and a storage unit such as CPU, RAM, ROM, or nonvolatile memory, which are interconnected via a bus.

To control the electromagnetic valves 22, 23, 41, and 42, the motor 433 and the like, the brake ECU 6 is connected to the various sensors 71 to 76. The brake ECU 6 receives inputs of information detected by the various sensors 71 to 76.

(Brake Control)

Brake control of the brake ECU 6 will be described below. The brake ECU 6 calculates a "demand braking force" required by the driver on the basis of the operating amount of the brake pedal 10 (movement of the input piston 13) or the operating force of the brake pedal 10, which is detected by the stroke sensor 71. Then, the brake ECU 6 calculates a "target servo pressure" that is an intended "servo pressure" on the basis of the "demand braking force". In the state where the first control valve 22 is opened and the second control valve 23 is closed, the brake ECU 6 feedback-controls the pressure decrease valve 41 and the pressure increase valve 42 such that the "servo pressure" inputted to the servo chamber 1A becomes the "target servo pressure", according to the detection signal from the brake fluid sensor 74.

Describing in detail, when the brake pedal 10 is not pressed, the above-mentioned state occurs. That is, the ball valve 442 closes the penetration passage 444a of the valve seat 444. The pressure decrease valve 41 is opened, and the pressure increase valve 42 is closed. That is, the first chamber 4A is separated from the second chamber 4B.

The second chamber 4B communicates with the servo chamber 1A via the pipe 163, and these chambers are at the same pressure. The second chamber 4B communicates with the third chamber 4C via the passages 445c, 445d of the control piston 445. Accordingly, the second chamber 4B and the third chamber 4C communicate with the reservoir 171 via the pipes 414, 161. One side of the first pilot chamber 4D is closed with the pressure increase valve 42, and the other side of the first pilot chamber 4D communicates with the reservoir 171 via the pressure decrease valve 41. The first pilot chamber 4D and the second chamber 4B are at the same pressure. The second pilot chamber 4E communicates with the first master chamber 1D via the pipes 511, 51, and these chambers are at the same pressure.

When the brake pedal 10 is pressed, as described above, the brake ECU 6 feedback-controls the pressure decrease valve 41 and the pressure increase valve 42 such that the "servo pressure" inputted to the servo chamber 1A becomes the "target servo pressure", according to the detection signal from the brake fluid sensor 74. That is, the brake ECU 6 performs control to close the pressure decrease valve 41 and open the pressure increase valve 42.

The pressure increase valve 42 is opened to communicate the accumulator 431 with the first pilot chamber 4D. The pressure decrease valve 41 is closed to disconnect the first pilot chamber 4D from the reservoir 171. The high-pressure brake fluid fed from the accumulator 431 increases the pressure in the first pilot chamber 4D. The increase in the pressure in the first pilot chamber 4D causes the control piston 445 to slide to the cylinder bottom face side. Then, the front end of the protruding portion 445b of the control piston 445 abuts the ball valve 442, and the ball valve 442 closes the passage 445d. Accordingly, the second chamber 4B is disconnected from the reservoir 171.

When the control piston 445 slides to the cylinder bottom face side, the protruding portion 445b pushes the ball valve 442 to the cylinder bottom face side, to separate the ball valve 442 from the valve seat face 444b. Thus, the first chamber 4A communicates with the second chamber 4B via the penetration passage 444a of the valve seat 444. Since the first chamber 4A receives the high-pressure brake fluid from the accumulator 431, the pressure in the second chamber 4B increases due to the communication. It is noted that as a distance between the ball valve 442 and the valve seat face 444b increases, the passage of the brake fluid becomes larger, and the fluid pressure in the passage downstream from the ball valve 442 becomes higher. That is, as the fluid pressure ("pilot pressure") of the brake fluid inputted to the first pilot chamber 4D becomes larger, a travel of the control piston 445 becomes larger and the distance between the ball valve 442 and the valve seat face 444b becomes larger to make the fluid pressure ("servo pressure") of the second chamber 4B higher.

With the increase in the pressure in the second chamber 4B, the pressure in the servo chamber 1A communicating with the second chamber 4B also increases. Due to the increase in the servo chamber 1A, the first master piston 14 advances, and the pressure in the first master chamber 1D increases. Then, the second master piston 15 also advances, and the pressure in the second master chamber 1E increases. Due to the pressure increase in the first master chamber 1D, the high-pressure brake fluid is supplied to the fluid pressure controller 53 and the second pilot chamber 4E. Although the pressure in the second pilot chamber 4E increases, the pressure in the first pilot chamber 4D also increases and thus, the sub piston 446 does not travel. As described above, the high-pressure (master pressure) brake fluid is supplied to the fluid pressure controller 53, activating a frictional brake to brake the vehicle.

To release the braking operation, conversely, the pressure decrease valve 41 is opened and the pressure increase valve 42 is closed, to communicate the reservoir 171 with the first pilot chamber 4D. As a result, the control piston 445 retreats to return to the state before pressing of the brake pedal 10.

Summary of this Embodiment

Summary of this embodiment will be described below using a time chart in FIG. 3. A "target pilot pressure" in FIG. 3 is a "pilot pressure" that is not calculated by the brake ECU 6, but is necessary for generating "target servo pressure" in the regulator 44. First, operations of the conventional servo pressure generator 4 will be described below. As described above, when the brake pedal 10 is pressed, the pressure increase valve 42 is opened, such that the "pilot pressure" inputted to the first pilot chamber 4D starts to rise (T1 in FIG. 3). Immediately after the "pilot pressure" starts to rise, due to a frictional force generated between a sealing member 445g between the control piston 445 and the cover member 441b, and a member in close contact with the sealing member 445g (in this embodiment, cover member 441b), the control piston 445 does not slide to the cylinder bottom face side (illustrated in FIG. 2), and the "pilot pressure" continues to rise (f1 in FIG. 3).

When the "pilot pressure" reaches the fluid pressure at which the control piston 445 slides to the cylinder bottom face side against the frictional force, the control piston 445 slides to the cylinder bottom face side. Then, the "pilot pressure" becomes constant (T2 to T4, f2 in FIG. 3). While the control piston 445 slides to the cylinder bottom face side, the "pilot pressure" is constant at the fluid pressure at which the control piston 445 starts to slide to the cylinder bottom face side (f2 in FIG. 3).

Then, the control piston 445 slides to the cylinder bottom face side, and the front end of the protruding portion 445b of the control piston 445 abuts the ball valve 442. Then, the constant "pilot pressure" starts to rise (T4, f3 in FIG. 3). With the increase in the "pilot pressure" (f4 in FIG. 3), the protruding portion 445b pushes the ball valve 442 to the cylinder bottom face side, to separate the ball valve 442 from the valve seat face 444b. Then, the "servo pressure" generates in the second chamber 4B (T4, f5 in FIG. 3), and rises (f6 in FIG. 3).

As described above, the frictional force generated between the sealing member 445g and the member in close contact with the sealing member and sliding of the control piston 445 to the cylinder bottom face side causes a time lag between the time when the "pilot pressure" is inputted to the first pilot chamber 4D and the time when the "servo pressure" is actually generated. The time lag will be hereinafter referred to as "servo pressure rising start time".

As described above, before the "servo pressure rising start time" elapses from inputting of the "pilot pressure" to the first pilot chamber 4D, the "servo pressure" is not generated and thus, no friction braking force occurs in the friction brake devices BFR to BRL. In this embodiment, the "servo pressure rising start time" is shortened by performing the pre-fill control to fully open the pressure increase valve 42 until the "servo pressure" is generated (T1 to T3 in FIG. 3), and to input the maximum "pilot pressure" to the first pilot chamber 4D.

Depending on the manufactured regulator 44, the distance between the front end of the protruding portion 445b of the control piston 445 and the ball valve 442 varies. For this reason, the "servo pressure rising start time" at the time when the pressure increase valve 42 is fully opened to input the maximum "pilot pressure" to the first pilot chamber 4D varies among products of the regulator 44. Thus, in this embodiment, for example, before shipment of the vehicle, the "servo pressure rising start time" at the time when the pressure increase valve 42 is fully opened to input the maximum "pilot pressure" to the first pilot chamber 4D is previously measured for each product of the friction braking force generator BF. Then, when the brake pedal 10 is pressed, the pressure increase valve 42 is fully opened to increase the "pilot pressure" inputted to the first pilot chamber 4D for the "pilot pressure increase time" (setting time) calculated based on the "servo pressure rising start time". In this manner, product-by-product variations in "servo pressure rising start time" are absorbed.

The "pilot pressure increase time" is a time during which the "pilot pressure" is increased to rapidly put the front end of the protruding portion 445b of the control piston 445 into contact with the ball valve 442. The "pilot pressure increase time" is a time during which the "pilot pressure" is increased to prevent the "pilot pressure" increased after the ball valve 442 is separated from the valve seat face 444b to generate the "servo pressure" from being inputted to the first pilot chamber 4D. This will be described below in detail using a flow chart.

(Servo Pressure Rising Start Time Measurement Processing)

"Servo pressure rising start time measurement processing" will be described below using a flow chart in FIG. 4. The "servo pressure rising start time measurement processing" is executed, for example, before shipment of the vehicle, or after an elapse of a predetermined time from execution of the "servo pressure rising start time measurement processing". When the "servo pressure rising start time measurement processing" starts, the brake ECU 6 (servo pressure rising start time measurement unit 6b), in Step S11, calculates the brake fluid temperature on the basis of the detection signal from at least one of the brake fluid sensor 73 to 75 and in Step S12, detects the "accumulator pressure" on the basis of the detection signal from the brake fluid sensor 75, and a program goes to Step S13.

In Step S13, in the closed state of the pressure decrease valve 41, the brake ECU 6 (servo pressure rising start time measurement unit 6b) fully opens the pressure increase valve 42 to generate a maximum "pilot pressure". Upon termination of Step S13, the program proceeds to Step S14.

In Step S14, the brake ECU 6 (servo pressure rising start time measurement unit 6b) measures the "servo pressure rising start time" (full-open rising start time) on the basis of the detection signal from the brake fluid sensor 74. The servo pressure rising start time means a period from a time when the first pilot chamber 4D is the value equivalent to the atmospheric pressure, the brake fluid flows into the first pilot chamber 4D, and the "pilot pressure" is inputted to the first pilot chamber 4D ("pilot pressure" is generated), to a time when the "servo pressure" is actually generated. In this embodiment, when the fluid pressure ("servo pressure") detected by the brake fluid sensor 74 becomes a specified pressure (for example, 0.1 Mpa) or more, the brake ECU 6 (servo pressure rising start time measurement unit 6b) determines that the "servo pressure" starts to rise, and the "servo pressure" is generated. The value equivalent to the atmospheric pressure includes the atmospheric pressure and pressures that are higher than the atmospheric pressure, but do not cause the "servo pressure". Upon termination of Step S14, the program proceeds to Step S15.

In Step S15, the brake ECU 6 (servo pressure rising start time measurement unit 6b) associates the "servo pressure rising start time" measured in Step S14 with the brake fluid temperature detected in Step S11, and the "accumulator pressure" detected in Step S12, and stores them in a storage unit 6a of the brake ECU 6. Upon termination of Step S15, "servo pressure increase start measurement time processing" finishes.

(Servo Pressure Control Processing)

"Servo pressure control processing" will be described below using a flow chart in FIG. 5. When an ignition of the vehicle is turned ON to make the vehicle drivable, "servo pressure control processing" starts, and the program proceeds to Step S21.

In Step S21, when the brake ECU 6 (braking force generation determination unit 6e) determines that there is a probability of generation of the braking force in the friction brake devices BFR to BRL on the basis of the detection signal from the stroke sensor 71 (Step S21: YES), the program proceeds to Step S22. When the brake ECU 6 (braking force generation determination unit 6e) determines that there is no probability of generation of the braking force in the friction brake devices BFR to BRL (Step S21: NO), processing in Step S21 is repeated. In this embodiment, when the driver presses the brake pedal 10, and the operating amount detected by the stroke sensor 71 is larger than a specified operating amount A, the brake ECU 6 determines that there is the probability of generation of the braking force in the friction brake devices BFR to BRL. On the contrary, when the operating amount detected by the stroke sensor 71 is the specified operating amount A or less, the brake ECU 6 determines that there is no probability of generation of the braking force in the friction brake devices BFR to BRL. The specified operating amount A is a value that is a braking force generation start operating amount B or less. The braking force generation start operating amount B actually generates the braking force in the friction brake devices BFR to BRL through pressing of the brake pedal 10 by the driver. That is, the operating amount (deadband) of the brake pedal 10, which is smaller than the braking force generation start operating amount B, generates no braking force in the friction brake devices BFR to BRL.

The brake ECU 6, in Step S22, calculates the brake fluid temperature on the basis of the detection signal from at least one of the brake fluid sensor 73 to 75, and in Step S23, detects the "accumulator pressure" on the basis of the detection signal from the brake fluid sensor 75, and the program goes to Step S24.

In Step S24, the brake ECU 6 (pilot pressure increase time calculation unit 6c) calculates the "pilot pressure increase time" on the basis of the "servo pressure rising start time" (full-open rising start time), the brake fluid temperature, and the "accumulator pressure" (Step S15 in FIG. 4), which are associated and stored in the storage unit 6a, the brake fluid temperature detected in Step S22, and the "accumulator pressure" detected in Step S23. This will be specifically described below.

First, the brake ECU 6 (pilot pressure increase time calculation unit 6c, pressure time correction unit) refers to the "pilot pressure increase time mapping base data" (dot-and-dash lines in FIG. 6) that indicates relationship between the "accumulator pressure" and the "pilot pressure increase time", which is previously stored in the storage unit 6a for each the brake fluid temperature. Then, referring to the "pilot pressure increase time mapping base data", the brake ECU 6 generates "pilot pressure increase time mapping data" (represented by a solid line in FIG. 6) on the basis of the "accumulator pressure" (1 in FIG. 6), the "servo pressure rising start time" (2 in FIG. 6), and the brake fluid temperature (Step S15 in FIG. 4), which are associated and stored in the storage unit 6a.

The relationship between the "accumulator pressure" and the "pilot pressure increase time" (dot-and-dash lines in FIG. 6) is previously identified for each the brake fluid temperature, and is previously stored in the brake ECU 6. In the "pilot pressure increase time mapping base data", as the "accumulator pressure" decreases, the "pilot pressure increase time" becomes longer. This is due to that as the "accumulator pressure" decreases, the generated "pilot pressure" decreases and the control piston 445 is harder to slide, requiring a longer "pilot pressure increase time". In the "pilot pressure increase time mapping base data", the "pilot pressure increase time" is set to be longer as the "servo pressure rising start time" increases. This is due to that as the "servo pressure rising start time" increases, the "pilot pressure increase time" necessary for starting to rise the "servo pressure" increases. In the "pilot pressure increase time mapping base data", the "pilot pressure increase time" is set to be longer as the brake fluid becomes cooler. This is due to that as the brake fluid becomes cooler, the passage of the brake fluid is inhibited. Therefore, the generated "pilot pressure" becomes lower and the control piston 445 is harder to slide, requiring a longer "pilot pressure increase time".

Next, the brake ECU 6 (pilot pressure increase time calculation unit 6c) corrects the generated "pilot pressure increase time mapping data" on the basis of a difference between the brake fluid temperature detected in Step S11 in FIG. 4 and the brake fluid temperature detected in Step S22, and temperature correction data. The temperature correction data is, for example, a map that uniquely associates the temperature difference with an offset amount, and is stored in the storage unit 6a. The brake ECU 6 acquires the offset amount for offsetting the generated "pilot pressure increase time mapping data" in the direction of increasing or decreasing the pilot pressure increase time, from the temperature correction data on the basis of the difference between the detected temperatures of the brake fluid. Then, as illustrated in FIG. 7, the brake ECU 6 corrects the generated "pilot pressure increase time mapping data" by offsetting the pilot pressure increase time of the generated "pilot pressure increase time mapping data" by the acquired offset amount.

In correction using the temperature correction data, the "pilot pressure increase time mapping data" is corrected to decrease the "pilot pressure increase time" as the brake fluid temperature detected in Step S22 is higher than the brake fluid temperature detected in Step S11 of the "servo pressure rising start time measurement processing" in FIG. 4. On the contrary, the "pilot pressure increase time mapping data" is corrected to increase the "pilot pressure increase time" as the brake fluid temperature detected in Step S22 becomes lower than the brake fluid temperature detected in Step S11 in FIG. 4. In the example illustrated in FIG. 7, the brake fluid temperature detected in Step S22 is 40° C., and the brake fluid temperature detected in Step S11 in FIG. 4 is 25° C. For this reason, the "pilot pressure increase time mapping data" is corrected to decrease the "pilot pressure increase time" by the offset amount calculated based on a difference (15° C.) between the brake fluid temperature (40° C.) detected in Step S22 and the brake fluid temperature (25° C.) detected in Step S11 in FIG. 4, and the temperature correction data. Dot-and-dash lines and a solid line in FIG. 7 indicate the "pilot pressure increase time mapping data" corrected based on the difference between the brake fluid temperature detected in Step S11 in FIG. 4 and the brake fluid temperature detected in Step S22, and the temperature correction data.

Referring to the temperature-corrected "pilot pressure increase time mapping data", the brake ECU 6 (pilot pressure increase time calculation unit 6c, pressure time correction unit) calculates the "pilot pressure increase time" (setting time) (2 in FIG. 7) corresponding to the "accumulator pressure" (1 in FIG. 7) detected in Step S23. Upon termination of Step S24, the program proceeds to Step S25.

In Step S25, in the state where the pressure decrease valve 41 is closed, the brake ECU 6 (pre-fill control unit 6d) fully opens the pressure increase valve 42 to input the brake fluid to the first pilot chamber 4D, thereby starting the pre-fill control to generate the "pilot pressure" (increase the "pilot pressure"). Upon termination of Step S25, the program proceeds to Step S26.

In Step S26, when determining that the "pilot pressure increase time" calculated in Step S24 elapses from generation of the "pilot pressure" in Step S25 (Step S26: YES), the brake ECU 6 moves the program to Step S27. On the contrary, when determining that the "pilot pressure increase time" calculated in Step S24 does not elapse from generation of the "pilot pressure" in Step S25 (Step S26: NO), the brake ECU 6 returns the program to Step S25.

In Step S27, the brake ECU 6 feedback-controls the pressure increase valve 42 and the pressure decrease valve 41 on the basis of the detection signals detected by the stroke sensor 71 and the brake fluid sensor 74, such that the "servo pressure" becomes the "target servo pressure". Upon termination of Step S27, the program proceeds to Step S28.

In Step S28, when determining that the driver releases the brake pedal 10 on the basis of the detection signal from at least one of the stroke sensor 71 and the brake stop switch 72 (Step S28: YES), the brake ECU 6 returns the program to Step S21. On the contrary, when determining that the driver presses the brake pedal 10 (Step S28: NO), the brake ECU 6 returns the program to Step S27.

Effects of this Embodiment

As apparent from the above description, when the brake pedal 10 is pressed (Step S21 in FIG. 5: YES), in Step S25 in FIG. 5, the "pre-fill control" to increase the "pilot pressure" for the "pilot pressure increase time" (setting time) set based on the "servo pressure rising start time" is performed. Thus, as illustrated in FIG. 3, the time from inputting of the "pilot pressure" to the first pilot chamber 4D of the regulator 44 to the generation of the "servo pressure" ("servo pressure rising start time") is shortened than conventional.

That is, conventionally, even before generation of the "servo pressure", the "pilot pressure" corresponding to the stroke of the brake pedal 10 is generated, delaying generation of the "servo pressure" caused by the mechanical action that is sliding of the control piston 445 in the regulator 44. However, in this embodiment, during a time when the brake pedal 10 is pressed to generate the "servo pressure", the brake fluid is flown from the accumulator 431 to the first pilot chamber 4D to increase the "pilot pressure", thereby shortening the time necessary for generating the "servo pressure".

Since the "pilot pressure increase time" is calculated based on the "servo pressure rising start time" previously measured by opening the pressure increase valve 42 (electromagnetic valve) (Step S24 in FIG. 5), product-by-product variations in the time for generating the servo pressure can be reduced.

The flow rate of the brake fluid flowing from the pressure increase valve 42 (electromagnetic valve) in the degree of opening from 0 to full varies among products of the pressure increase valve 42. Variations in the flow rate of the brake fluid flowing from the fully-opened pressure increase valve 42 among products of the pressure increase valve 42 are small. As described above, in Step S15 in FIG. 4, the storage unit 6a stores the "servo pressure rising start time" (full-open rising start time) in the state where the pressure increase valve 42 is fully opened. Since the variations in the flow rate of the brake fluid flowing from the fully-opened pressure increase valve 42 are small, small variations in the "servo pressure rising start time" (full-open rising start time) among products of the pressure increase valve 42 can be acquired. Then, in Step S24 in FIG. 5, the brake ECU 6 calculates the "pilot pressure increase time" (setting time) on the basis of the "servo pressure rising start time" (full-open rising start time) stored in the storage unit 6a. Then, in Step S25 (pre-fill control) in FIG. 5, the brake ECU 6 (pre-fill control unit) fully opens the pressure increase valve 42 (electromagnetic valve) for the "pilot pressure increase time" (setting time). Thereby, at fully opening of the pressure increase valve 42, the flow rate of the brake fluid hardly varies among products of the pressure increase valve 42. This prevents a lag of generation of the "servo pressure", and generation of an excessive "servo pressure" that is not based on the operating amount of the brake pedal 10 (brake operating member), due to variations in the flow rate of the brake fluid among products of the pressure increase valves 42. Since the pressure increase valve 42 is fully opened in the pre-fill control, the brake fluid can be flown at the maximum flow rate from the pressure increase valve 42 into the first pilot chamber 4D in the pre-fill control. Therefore, the "servo pressure rising start time" taken from pressing of the brake pedal 10 to generation of the "servo pressure" can be shortened as much as possible.

Also in Step S25 in FIG. 5, since the "pilot pressure" is increased by fully opening the pressure increase valve 42, the flow rate flowing to the pressure increase valve 42 becomes stable in any manufactured pressure increase valve 42, preventing an excessive "servo pressure" that is not based on the operating amount of the brake pedal 10, which is caused by the fact that the "pilot pressure" increased after generation of the "servo pressure" is inputted to the first pilot chamber 4D.

The "pilot pressure increase time" (setting time) is calculated based on the "accumulator pressure" in the pre-fill control (at braking). This prevents a lag of generation of the "servo pressure" and an excessive "servo pressure" that is not based on the operating amount of the brake pedal 10 due to variations in the "accumulator pressure" in the pre-fill control. That is, as the "accumulator pressure" decreases, the "pilot pressure" generated at the pressure increase valve 42 decreases, further delaying generation of the "servo pressure" caused by the mechanical action in the regulator 44. Thus, in Step S24 in FIG. 5, the brake ECU 6 (pilot pressure increase time calculation unit 6c, pressure time correction unit) calculates and corrects the "pilot pressure increase time" (setting time) stored in the storage unit 6a on the basis of the "accumulator pressure" detected by the brake fluid sensor 75 (accumulator pressure detection unit). In this embodiment, as illustrated in FIG. 7, the "pilot pressure increase time" is calculated using the "pilot pressure increase time mapping data" in which the "pilot pressure increase time" becomes longer as the "accumulator pressure" decreases. This prevents a lag of generation of the "servo pressure".

As the "accumulator pressure" increases, the "pilot pressure" occurring in the pressure increase valve 42 also increases, promoting generation of the "servo pressure" caused by the mechanical action in the regulator 44. However, in this embodiment, as illustrated in FIG. 7, the "pilot pressure increase time" is calculated using the "pilot pressure increase time mapping data" in which the "pilot pressure increase time" decreases as the "accumulator pressure" increases, preventing an excessive "servo pressure" that is not based on the operating amount of the brake pedal 10, which is caused by inputting the "pilot pressure" increased after generation of the "servo pressure" into the first pilot chamber 4D.

In Step S24 in FIG. 5, the brake ECU 6 (pilot pressure increase time calculation unit 6c, temperature time correction unit) corrects the "pilot pressure increase time mapping data" on the basis of the brake fluid temperature detected by at least one of the brake fluid sensors 73 to 75 (temperature detection unit), and calculates and corrects the "pilot pressure increase time" (setting time) stored in the storage unit 6a. This prevents a lag of generation of the "servo pressure" and generation of an excessive "servo pressure" that is not based on the operating amount of the brake pedal 10, due to variations in the brake fluid temperature in the pre-fill control. That is, as the brake fluid becomes cooler, the brake fluid is harder to flow, further delaying the "servo pressure" caused by the mechanical action in the regulator 44. However, in this embodiment, as illustrated in FIG. 7, the "pilot pressure increase time" is calculated using the "pilot pressure increase time mapping data" in which the "pilot pressure increase time" increases as the brake fluid temperature lowers. This can prevent a delay of generation of the "servo pressure".

As the brake fluid becomes hotter, a flowing resistance of the brake fluid lowers, further promoting the "servo pressure" caused by the mechanical action in the regulator 44. However, in this embodiment, as illustrated in FIG. 7, the "pilot pressure increase time" is calculated using the "pilot pressure increase time mapping data" corrected such that the "pilot pressure increase time" decreases as the brake fluid temperature rises. This can prevent generation of an excessive "servo pressure" that is not based on the operating amount of the brake pedal 10, which is caused by inputting the "pilot pressure" increased after generation of the "servo pressure" into the first pilot chamber 4D.

In Step S14 in FIG. 4, the servo pressure rising start time measurement unit 6b (determination unit) determines that the "servo pressure" starts to rise. Then, the servo pressure rising start time measurement unit 6b (measurement unit) opens the pressure increase valve 42 (electromagnetic valve) from the time when the "pilot pressure" is the value equivalent to the atmospheric pressure to the time when the "servo pressure" is determined to start to rise, and measures the "servo pressure rising start time". Therefore, even when the "servo pressure rising start time" changes due to a change in the vehicular braking device 1000 over time, the servo pressure rising start time measurement unit 6b (determination unit, measurement unit) can measure the "servo pressure rising start time" without putting the vehicle into a maintenance shop. This can address the change in the servo pressure rising start time" due to the change in the vehicular braking device 1000 over time.

In Step S15 in FIG. 4, the storage unit 6a associates the "pilot pressure increase time" (setting time) with the "accumulator pressure" detected by the brake fluid sensor 75 (accumulator pressure detection unit) at measurement of the "pilot pressure increase time", and stores them. Then, in Step S24 in FIG. 5, the brake ECU 6 (pilot pressure increase time calculation unit 6c, pressure time correction unit) calculates the "pilot pressure increase time" on the basis of the accumulator pressure" and the "servo pressure rising start time" (setting time), which are associated and stored in the storage unit 6a, and the "accumulator pressure" detected by the brake fluid sensor 75 (accumulator pressure detection unit). Then, in Step S25, the brake ECU 6 (pre-fill control unit 6d) opens the pressure increase valve 42 (electromagnetic valve) for the "pilot pressure increase time" (setting time). This prevents a delay of generation of the "servo pressure" and generation of an excessive "servo pressure" that is not based on the operating amount of the brake pedal 10 due to a difference between the "accumulator pressure" at measurement of the "servo pressure rising start time" and the "accumulator pressure" in the pre-fill control.

In Step S15 in FIG. 4, the "servo pressure rising start time" and the brake fluid temperature at measurement are associated with each other, and are stored in the storage unit 6a. Then, in Step S24 in FIG. 5, the "pilot pressure increase time" is calculated based on the brake fluid temperature and the "servo pressure rising start time", which are associated and stored in the storage unit 6a, and the detected brake fluid temperature. This prevents a delay of generation of the "servo pressure" and generation of an excessive "servo pressure" that is not based on the operating amount of the brake pedal 10, due to a difference between the brake fluid temperature at measurement of the "servo pressure rising start time" and the brake fluid temperature in the pre-fill control.

In Step S14 in FIG. 4, the brake ECU 6 (servo pressure rising start time measurement unit 6b) determines that the "servo pressure" starts to rise on the basis of the "servo pressure" detected by the brake fluid sensor 74 (servo pressure detection unit). As described above, since the brake fluid sensor 74 (servo pressure detection unit) that directly detects the "servo pressure" determines that the "servo pressure" starts to rise, the "servo pressure rising start time" can be correctly detected.

Other Embodiments

In the above-mentioned embodiment, in Step S14 in FIG. 4, the brake fluid sensor 74 that detects the "servo pressure" measures the "servo pressure rising start time". However, the brake fluid sensor 75 that detects the "accumulator pressure" may measure the "servo pressure rising start time". When the ball valve 442 is separated from the valve seat face 444b to generate the "servo pressure", the "accumulator pressure" decreases. In this embodiment, the brake fluid sensor 75 detects a decrease in the "accumulator pressure", thereby detecting generation of the "servo pressure" to measure the "servo pressure rising start time".

In the above-mentioned embodiment, the brake fluid temperature is calculated according to the detection signal from at least one of the brake fluid sensors 73 to 75. However, the brake fluid temperature may be calculated based on conducting time of the pressure increase valve 42 or the pressure decrease valve 41, travelling time of the vehicle, driving time of the engine, outdoor temperature, and so on.

In the above-mentioned embodiment, in Step S21, the brake ECU 6 (braking force generation determination unit) detects whether or not there is the probability of generation of the braking force in the friction brake devices BFR to BRL according to the detection signal from the stroke sensor 71. However, the brake ECU 6 (braking force generation determination unit, pre-fill control unit) may determine the level of the probability of generation of the braking force in the friction brake devices BFR to BRL according to the detection signal from the stroke sensor 71, and when determining that the probability of generation of the braking force in the friction brake devices BFR to BRL is high, may perform the pre-fill control. Further, when determining start of anti-skid control or anti-collision control, the brake ECU 6 may determine that the probability of generation of the braking force in the friction brake devices BFR to BRL is high (YES in Step S21). Alternatively, the brake ECU 6 may detect whether or not there is the probability of generation of the braking force in the friction brake devices BFR to BRL according to the detection signal from the brake stop switch 72.

In the above-mentioned embodiment, in Step S24 in FIG. 5, the brake ECU 6 calculates the "pilot pressure increase time" by referring to the "pilot pressure increase time mapping data" that indicates relationship between the "accumulator pressure" and the "pilot pressure increase time". However, the brake ECU 6 may calculate the "pilot pressure increase time" by using an arithmetic expression. Further, the brake ECU 6 may calculate the "pilot pressure increase time" on the basis of the "accumulator pressure" detected in Step S23 referring to the non-temperature corrected "pilot pressure increase time mapping data", and may temperature correct the "pilot pressure increase time" on the basis of the brake fluid temperature detected in Step S22.

In the above-mentioned embodiment, the "pre-fill control" to increase the "pilot pressure" for the "pilot pressure increase time" (setting time) set based on the "servo pressure rising start time" is performed. However, "pre-fill control" to increase the "pilot pressure" for the "servo pressure rising start time" may be performed.

In the above-mentioned embodiment, the vehicular braking device 1000 is provided with the servo pressure rising start time measurement unit 6b that fully opens the pressure increase valve 42, determines start of rise of the "servo pressure", and measures the "servo pressure rising start time". However, the servo pressure rising start time measurement unit 6b may not be provided in the vehicular braking device 1000 or a vehicle equipped with the vehicular braking device 1000, and may be provided outside of the vehicular braking device 1000 or the vehicle. In such embodiment, before shipment of the vehicular braking device 1000 or the vehicle, or at putting the vehicular braking device 1000 or the vehicle into a maintenance shop, the servo pressure rising start time measurement unit 6b provided outside of the vehicular braking device 1000 or the vehicle may measure the "servo pressure rising start time".

In the above-mentioned embodiment, in Step S25 in FIG. 5, the brake ECU 6 fully opens the pressure increase valve 42. However, the brake ECU 6 may open the pressure increase valve 42 at any degree of opening of non-full (for example, 80% of full). As illustrated in FIG. 8, when a supply current is a predetermined current A or less, the flow rate of the pressure increase valve 42 varies with respect to the supply current. However, when a supply current R1 that causes the pressure increase valve 42 to fully open as well as a supply current R2 that is the predetermined current A or more are supplied to the pressure increase valve 42, the flow rate of the pressure increase valve 42 becomes constant with respect to the supply current. In this manner, the supply current R2 that makes the flow rate constant may be supplied to the pressure increase valve 42. Alternatively, the brake ECU 6 may amplify the operating amount of the brake pedal 10 detected by the stroke sensor 71 a few times (for example, 100 times) and opens the pressure increase valve 42.

In the above-mentioned embodiment, the brake operating member for transmitting the operating force of the driver to the input piston 13 is the brake pedal 10. However, the brake operating member is not limited to the brake pedal 10, and may be a brake lever or a brake handle. As a matter of course, the vehicular braking device 1000 in this embodiment is applicable to a motorcycle and other vehicles to achieve the technical concept of the present invention.

REFERENCE SIGNS LIST

1: Master cylinder device, 10: Brake pedal (Brake operating member), 11: Main cylinder (Master cylinder), 12: Cover cylinder (Master cylinder), 14: First output piston, 15: Second output piston, 1A: Servo chamber, 1D: First master chamber, 1E: Second master chamber, 4D: First pilot chamber, 6: Brake ECU, 6a . . . Storage unit, 6b . . . Servo pressure rising start time measurement unit (Determination unit, Measurement unit), 6c . . . Pilot pressure increase time calculation unit (Pressure time correction unit, Temperature time correction unit), 6d . . . Pre-fill control unit, 6e . . . Braking force generation determination unit, 41: Pressure decrease valve, 42: Pressure increase valve (Electromagnetic valve), 44: Regulator, 431: Accumulator, 72: Stroke sensor (Brake operating amount detection unit), 73: Brake fluid sensor (Temperature detection unit), 74: Brake fluid sensor (Temperature detection unit, Servo pressure detection unit), 75: Brake fluid sensor (Temperature detection unit, Accumulator pressure detection unit), Bfl, Bfr, Brl, Brr: Friction brake device, 541 to 544: Wheel cylinder, 5FR, 5FL, 5RR, 5RL: Wheel, 1000: Vehicular braking device

The invention claimed is:
1. A vehicular braking device comprising:
a master cylinder connected to a wheel cylinder of a friction brake device for applying a braking force to a wheel of a vehicle, the master cylinder supplying a brake fluid to the wheel cylinder;
an output piston slidably disposed in the master cylinder, the output piston being driven by a servo pressure that is a fluid pressure in a servo chamber delimited by the master cylinder to change the volume of a master chamber filled with the brake fluid supplied to the wheel cylinder;

a regulator that allows the servo pressure corresponding to a pilot pressure that is a fluid pressure in a partitioned pilot chamber to generate in the servo chamber, on the basis of the fluid pressure of the brake fluid accumulated in an accumulator;

an electromagnetic valve that adjusts a flow of the brake fluid from the accumulator to the pilot chamber;

a braking force generation determination unit that determines a level of probability of generation of the braking force in the friction brake device;

a storage unit that stores a servo pressure rising start time that is a time from when the pilot pressure is a value equivalent to an atmospheric pressure to when the servo pressure starts to rise by inputting the brake fluid from the accumulator into the pilot chamber by means of the electromagnetic valve, or a setting time set based on the servo pressure rising start time; and a pre-fill control unit that performs pre-fill control to open the electromagnetic valve and input the brake fluid from the accumulator into the pilot chamber for the servo pressure rising start time or the setting time stored in the storage unit, when the braking force generation determination unit determines that the probability of generation of the braking force in the friction brake device is high.

2. The vehicular braking device according to claim 1, wherein the storage unit stores a full-open rising start time, as the servo pressure rising start time, which is a time from when the pilot pressure is the value equivalent to the atmospheric pressure to when the electromagnetic valve is fully opened to input the brake fluid from the accumulator to the pilot chamber and the servo pressure starts to rise, or stores, as the setting time, time set based on the full-open rising start time, and in the pre-fill control, the pre-fill control unit fully opens the electromagnetic valve for the full-open rising start time or the setting time stored in the storage unit.

3. The vehicular braking device according to claim 1, further comprising:

an accumulator pressure detection unit that detects an accumulator pressure that is the fluid pressure of the brake fluid stored in the accumulator; and a pressure time correction unit that corrects the servo pressure rising start time or the setting time stored in the storage unit on the basis of the accumulator pressure detected by the accumulator pressure detection unit, wherein in the pre-fill control, the pre-fill control unit opens the electromagnetic valve for the servo pressure rising start time or the setting time corrected by the pressure time correction unit.

4. The vehicular braking device according to claim 1, further comprising:

a temperature detection unit that detects temperature of the brake fluid; and a temperature time correction unit that corrects the servo pressure rising start time or the setting time stored in the storage unit on the basis of the brake fluid temperature detected by the temperature detection unit, wherein in the pre-fill control, the pre-fill control unit opens the electromagnetic valve for the servo pressure rising start time or the setting time that is corrected by the temperature time correction unit.

5. The vehicular braking device according to claim 1, further comprising:

a determination unit that determines whether or not the servo pressure starts to rise; and a measurement unit that opens the electromagnetic valve from a time when the pilot pressure is the value equivalent to the atmospheric pressure to a time when the determination unit determines that the servo pressure starts to rise, and measures the servo pressure rising start time, wherein the storage unit stores the servo pressure rising start time measured by the measurement unit, or the setting time set based on the servo pressure rising start time measured by the measurement unit.

6. The vehicular braking device according to claim 5, further comprising an accumulator pressure detection unit that detects an accumulator pressure that is the fluid pressure of the brake fluid stored in the accumulator, wherein the storage unit associates the servo pressure rising start time or the setting time with the accumulator pressure detected by the accumulator pressure detection unit, when the measurement unit measures the servo pressure rising start time, and stores the associated servo pressure rising start time or the setting time, and in the pre-fill control, the pre-fill control unit opens the electromagnetic valve for the servo pressure rising start time or the setting time that is associated with the accumulator pressure detected by the accumulator pressure detection unit.

7. The vehicular braking device according to claim 5, further comprising a temperature detection unit that detects temperature of the brake fluid, wherein the storage unit associates the servo pressure rising start time or the setting time with the brake fluid temperature detected by the temperature detection unit when the measurement unit detects the servo pressure rising start time, and in the pre-fill control, the pre-fill control unit opens the electromagnetic valve for the servo pressure rising start time or the setting time that is associated with the brake fluid temperature.

8. The vehicular braking device according to claim 5, further comprising a servo pressure detection unit that detects the servo pressure, wherein the determination unit determines that the servo pressure starts to rise on the basis of the servo pressure detected by the servo pressure detection unit.

9. The vehicular braking device according to claim 5, further comprising an accumulator pressure detection unit that detects an accumulator pressure that is the fluid pressure of the brake fluid stored in the accumulator, wherein the determination unit determines that the servo pressure starts to rise on the basis of the accumulator pressure detected by the accumulator pressure detection unit.

* * * * *